US008868804B2

(12) United States Patent
Gole et al.

(10) Patent No.: US 8,868,804 B2
(45) Date of Patent: Oct. 21, 2014

(54) UNIFIED I/O ADAPTER

(75) Inventors: Abhijeet P. Gole, Cupertino, CA (US); Pantas Sutardja, Los Gatos, CA (US); David Geddes, Fremont, CA (US)

(73) Assignee: Marvell World Trade Ltd., Barbadus ( * ) Notice: Subject to any disclaimer, the term of this patent is extended or adjusted under 35 U.S.C. 154(b) by 141 days.

(21) Appl. No.: 13/274,707

(22) Filed: Oct. 17, 2011

(65) Prior Publication Data

US 2012/0102245 A1  Apr. 26, 2012

Related U.S. Application Data

(60) Provisional application No. 61/405,091, filed on Oct. 20, 2010.

(51) Int. Cl.
*G06F 3/00* (2006.01)
*G06F 15/16* (2006.01)
*G06F 13/38* (2006.01)
*G06F 13/40* (2006.01)

(52) U.S. Cl.
CPC .......... *G06F 13/4022* (2013.01); *G06F 13/385* (2013.01); *G06F 2213/3808* (2013.01)
USPC ............................................ 710/72; 709/201

(58) Field of Classification Search
CPC .. G06F 3/067; G06F 12/0866; G06F 12/0868
See application file for complete search history.

(56) References Cited

U.S. PATENT DOCUMENTS 6,282,616 B1 * 8/2001 Yoshida et al. ............... 711/133
7,421,532 B2   9/2008 Stewart et al.
2004/0030857 A1   2/2004 Krakirian et al.
2004/0230735 A1  11/2004 Moll
2008/0010411 A1   1/2008 Yang et al.
2009/0327588 A1  12/2009 Sutardja et al.
2010/0185719 A1 * 7/2010 Howard ......................... 709/201

FOREIGN PATENT DOCUMENTS

WO   2009/158096 A1   12/2009

OTHER PUBLICATIONS

Patent Cooperation Treaty (PCT) International Search Report and Written Opinion in co-pending International Patent Application No. PCT/US2011/056532 (International Filing Date Oct. 17, 2011) having a date of mailing of Jan. 30, 2012 (10 pgs).

* cited by examiner

*Primary Examiner* — Hyun Nam

(57) ABSTRACT

Systems, methods, and other embodiments associated with a unified hybrid input/output adapter are described. According to one embodiment, an apparatus includes an Input/Output (I/O) interconnect configured to connect with a host device and to provide communications with the host device. The apparatus also includes a network adapter connected to the I/O interconnect and configured to communicate with a network storage. The apparatus includes a host adapter connected to the I/O interconnect and configured to communicate with a first storage device and a second storage device. The first storage device has a higher latency than the second storage device. The apparatus further includes a storage logic configured to control the I/O interconnect to cause storage access requests from the host device to be cached in the second storage device via the host adapter.

19 Claims, 5 Drawing Sheets

UNIFIED I/O ADAPTER

CROSS REFERENCE TO RELATED APPLICATIONS

This present disclosure claims the benefit of U.S. provisional application Ser. No. 61/405,091 filed on Oct. 20, 2010, which is incorporated herein by reference.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

An Input/Output (I/O) bottleneck is one example of a processing difficulty that can negatively impact performance in a computing system. Multi-core processors are one technology that experience I/O bottlenecks.

Many multi-core processors improve processor use by operating multiple instances of an operating system. A multi-core processor may provide multiple virtual instances of a system resource to accommodate I/O requests from different instances of the operating system. However, while a resource may have multiple virtual instances there is still only a single physical resource. This discrepancy results in I/O bottlenecks since the physical resource cannot not service multiple requests simultaneously.

In addition to an increase in I/O bottlenecks, virtualization may also cause processing overhead through software routines that manage the virtual instances. Thus, while virtualization in a multi-core processor may result in better processor utilization it also results in several inefficiencies.

SUMMARY

In one embodiment an apparatus includes an Input/Output (I/O) interconnect configured to connect with a host device and to provide communications with the host device. The apparatus also includes a network adapter connected to the I/O interconnect and configured to communicate with a network storage and a host adapter connected to the I/O interconnect. The host adapter is configured to communicate with a first storage device and a second storage device. The first storage device has a higher latency than the second storage device. The I/O interconnect is configured to provide communications between the host adapter, the network adapter, and the host device through switchable connection paths embodied in an integrated circuit that connects the I/O interconnect with the host adapter and the network adapter.

In one embodiment, the I/O interconnect is a peripheral component switch that is configured to selectively switch communications between the host device and the host adapter, and between the host device and the network adapter. The apparatus further includes a storage logic configured to control the I/O interconnect to cause storage access requests from the host device to be cached in the second storage device via the host adapter. The storage logic is configured to control the I/O interconnect to redirect the storage access requests from the host device when the storage access requests are addressed to the network storage or to the first storage device to service the storage access requests through a cache in the second storage device.

In another embodiment, the apparatus includes a servicing logic configured to control the host adapter to send a selected request from storage access requests cached in the second storage device to the network adapter to be processed if the selected request is addressed to the network storage, and to control the host adapter to process the selected request if the selected request is addressed to the first storage device.

In another embodiment, a method includes providing an Input/Output (I/O) interconnect to switch communications between a host device and a host adapter, and between the host device and a network adapter. The host adapter communicates with a first storage device and a second storage device and the first storage device has a higher latency than the second storage device. The network adapter communicates with a network storage.

The method also includes caching a storage access request from the host adapter in the second storage device and processing the storage access request by the host adapter if the storage access request is addressed to the first storage device. The method includes sending the storage access request from the second storage device via the I/O interconnect to the network adapter to be processed if the storage access request is addressed to the network storage.

In one embodiment, the method includes providing a communication path between the host adapter and the network adapter via the I/O interconnect using switchable connection paths embodied in an integrated circuit that connect the I/O interconnect with the host adapter and the network adapter. In another example, the method includes redirecting the storage access request from the host device on the I/O interconnect to the host adapter when the storage access request is directed to the network storage or the first storage device.

In another embodiment, an integrated circuit includes a host adapter connected to an Input/Output (I/O) interconnect and configured to communicate with a high-latency storage device and a low-latency storage device. The integrated circuit also includes a storage logic configured to control the I/O interconnect to cause the read/write requests to be cached in the low-latency storage device via the host adapter. In one example, the host device is a multi-core processor that operates multiple instances of an operating system that communicate with a network adapter and the host adapter through the I/O interconnect. The I/O interconnect is, for example, embodied on a chip that is configured to communicate with the host device. Additionally, the storage logic is configured to control the I/O interconnect to redirect the read/write requests when the read/write requests are sent to a network storage or the high-latency storage from the host device to service the read/write requests through a cache in the low-latency storage device.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the Figures represent one example of the boundaries. In some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Described herein are examples of systems, methods, and other embodiments associated with communications in a unified hybrid adapter. In one embodiment, the unified hybrid adapter improves efficiency of a multi-core processor by implementing multiple virtualized resources in a single adapter. Implementing system resources in this way removes I/O bottlenecks and process management overhead from the processor to provide efficient access to the resources.

Figure 1:
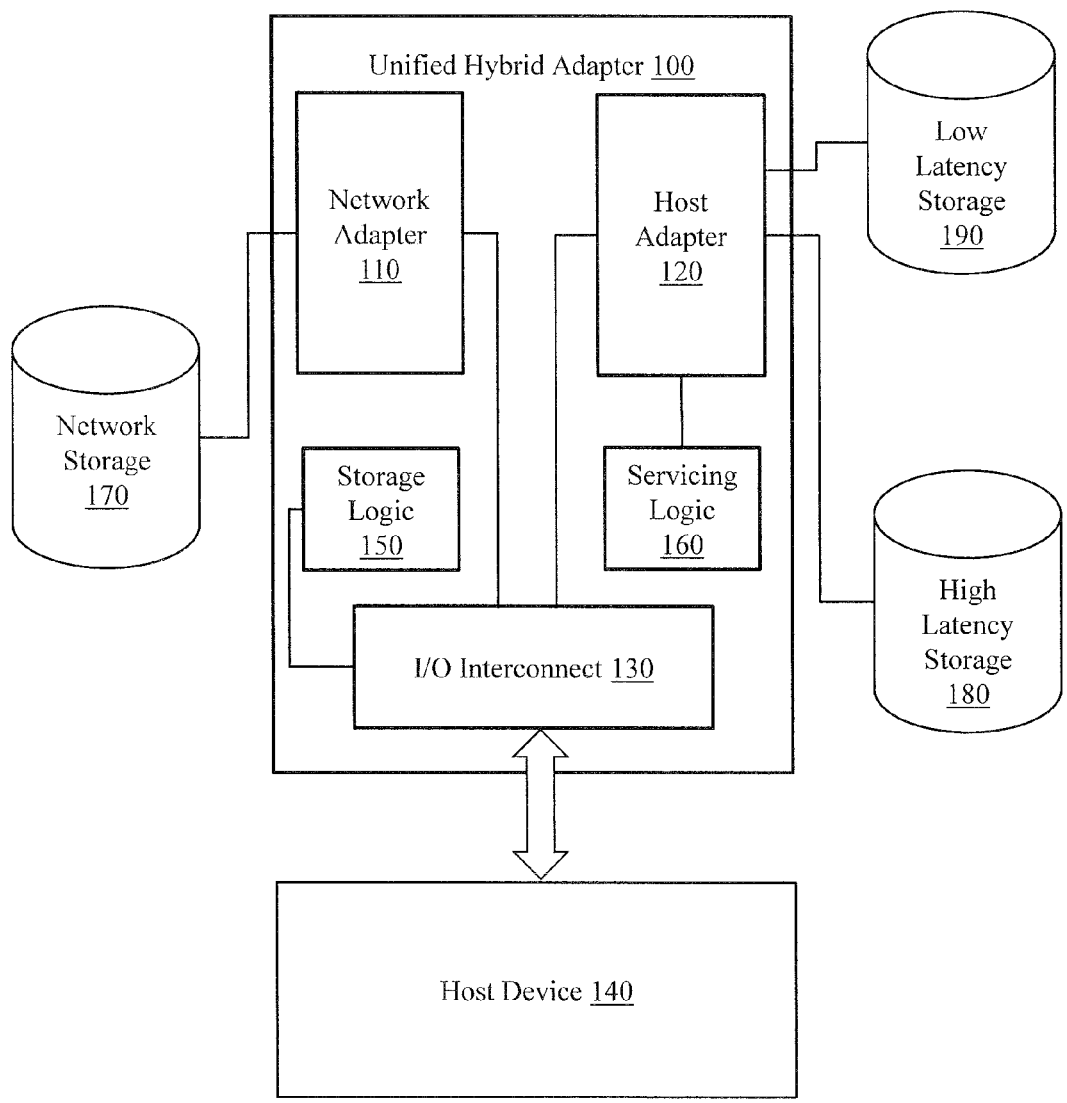
FIG. 1 illustrates one embodiment of a unified hybrid adapter.

With reference to FIG. 1, one embodiment of a unified hybrid adapter 100 is shown that provides an Input/Output (I/O) interconnect 130 between a host device 140 and one or more system resources. In one embodiment, the unified hybrid adapter 100 may be implemented in a device with system resources that include a network adapter 110 and a host adapter 120. The I/O interconnect 130 connects, for example, the host adapter 120 and the network adapter 110 to the host device 140. In one embodiment, the I/O interconnect 130 is a peripheral component switch that selectively switches communications between components such as the host device 140 and the network adapter 110. The network adapter 110 provides, for example, network access to network storage 170. The host adapter 120 provides, for example, access to high-latency storage 180 and to low-latency storage 190.

In one embodiment, the unified hybrid adapter 100 also includes one or more logics. For example, the unified hybrid adapter 100 includes storage logic 150 and servicing logic 160. The storage logic 150 and the servicing logic 160 are configured to operate and provide the host device 140 with access to multiple system resources (e.g. network storage 170 and high-latency storage 180) while improving access latencies. In one embodiment, the storage logic 150 and the servicing logic 160 are configured to operate and provide the host device 140 with access to multiple system resources. Details of the functionality of the unified hybrid adapter 100 will be described in combination with FIG. 2.

Figure 2:
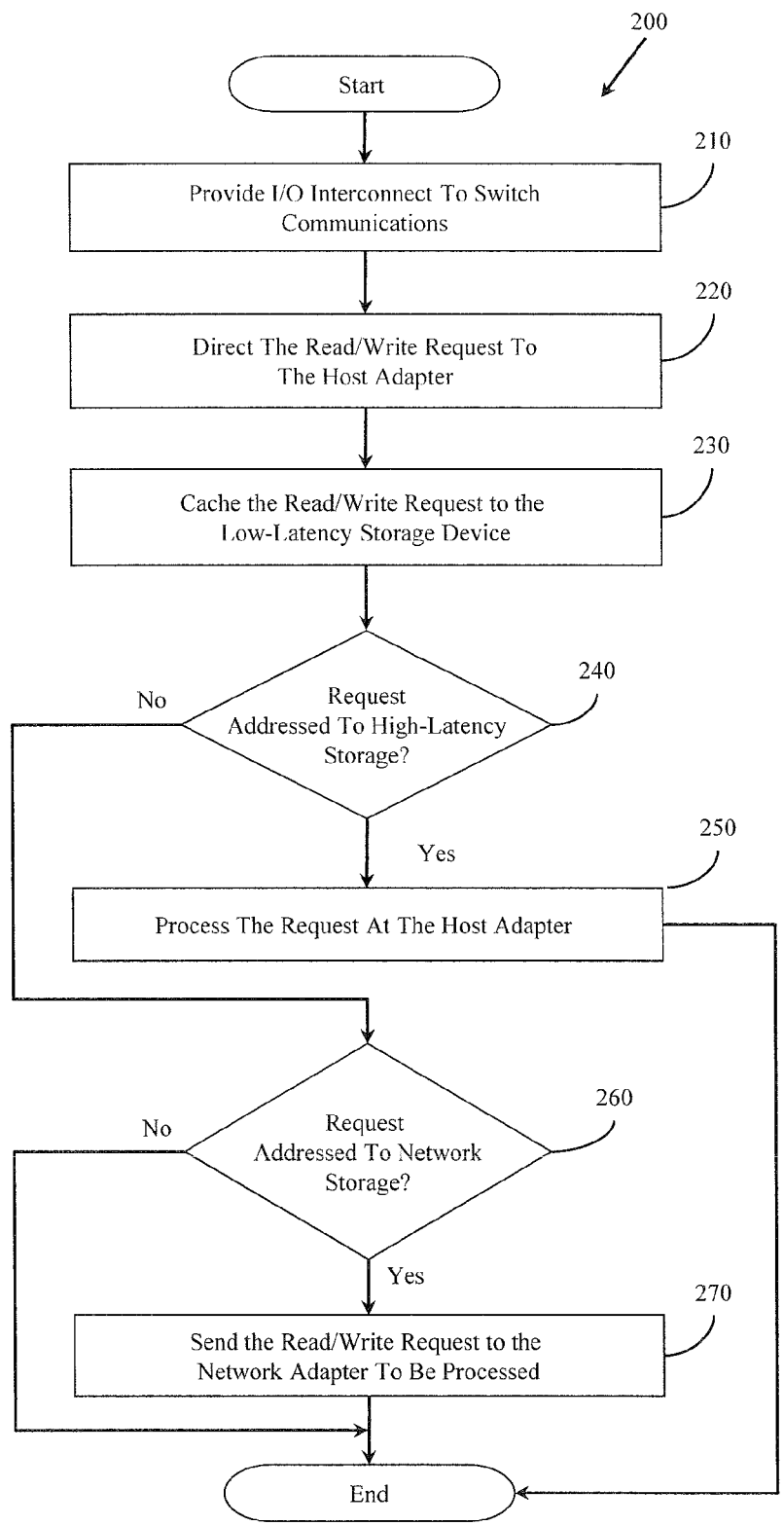
FIG. 2 illustrates one embodiment of a method associated with communications in a unified hybrid adapter.

With reference to FIG. 2, one embodiment of a method 200 associated with communications in the unified hybrid adapter 100 is illustrated. FIG. 2 is discussed from the perspective that the method 200 is implemented and performed by the unified hybrid adapter 100 to control communications sent through the I/O interconnect 130.

For example, at 210, the method 200 provides an I/O interconnect (e.g. I/O interconnect 130) that operates to switch communications between components in the unified hybrid adapter 100. An interface between the I/O interconnect 130 and the host device 140 relays communications transmitted from/to the host device 140 to/from elements in the unified hybrid adapter 100.

In one embodiment, providing the I/O interconnect 130 includes providing multiple connection/communication paths that are switchable between the elements (e.g. between host adapter 120, network adapter 110, and host device 140). For example, the switchable connection paths of the I/O interconnect 130 can connect the host adapter 120 and the network adapter 110 to the host device 140 and also connect the network adapter 110 to the host adapter 120. Thus, in one example, the I/O interconnect 130 is a switch that selectively changes communication paths based on a destination address for a communication received at the I/O interconnect 130. As will be described below, the communication includes storage access requests (e.g. read/write requests) that come from the host device 140 and are directed to either the network storage 170 or the high latency storage 180. The I/O interconnect 130 switches the paths to direct the read/write requests to the appropriate component.

The I/O interconnect 130 is, for example, a switch that is a 2×1 switch, an N×1 switch (where N denotes a positive integer), an N×N switch, and so on. In one example, the I/O interconnect 130 is a switch that is compatible with the peripheral component interconnect express (PCIe) standard and/or can be implemented to be compatible with derivatives of the PCIe standard as the standard changes.

Continuing with FIG. 2, at 220, the method 200 directs a read/write request from the host device 140 through the I/O interconnect 130 to the host adapter 120. In one example, the storage logic 150 controls the I/O interconnect 130 to direct read/write requests from the host device 140 to the host adapter 120 regardless of the destination of the read/write request. However, when a communication arrives, the adaptor 100 does not know what type of request it is. The storage logic 120, for example, is configured to identify when a communication from the host device 140 is a read/write request and controls the I/O interconnect 130 to switch connection paths to direct the read/write request to the host adapter 120. In one example, the storage logic 150 identifies the request as a read/write request by determining if the request is addressed to the network storage 170 or the high-latency storage 180. If so, the method presumes that the request is a read/write request. In this way, the storage logic 150 causes read/write requests to be directed to the host adapter 120 while other communications (e.g. basic network communications, non storage access requests) are directed as originally requested by the host device 140.

At 230, the method 200 caches the read/write request in the low-latency storage device 190 via the host adapter 120. In one embodiment, the host adapter 120 automatically forwards read/write requests that have been directed from I/O interconnect 130 to the low-latency device 190 to be cached. In another embodiment, the host adapter 120 and/or associated logic (e.g. servicing logic 160) perform caching operations on the read/write requests. For example, the caching operations may include determining whether a read/write request causes a cache miss event, a cache hit event, or other cache event in the low-latency storage 190. In this way, the read/write request is efficiently cached in the low-latency storage 190.

In one embodiment, directing and caching the read/write requests are transparent to the host device 140. The host device 140 operates, for example, to send/receive the read/write requests to/from the unified hybrid adapter 100 as though the request is being directed to the addressed device. In this way, latencies associated with I/O requests to, for example, the network storage 170 are improved. In one embodiment, directing and caching the read/write requests (e.g. storage access requests) in this way provides for improved servicing of the requests without modifying operations of the host device 140.

Additionally, the unified hybrid adapter 100 provides access to more than one resource (e.g. network storage 170, high latency storage 180). Typically, a single adapter provides access to only a single resource. Consolidating multiple adapters into the unified hybrid adapter 100 relieves processing overhead from the host device 140 since requests are sent to a single adapter instead of multiple adapters. Thus, the host device 140 processes requests to a single adapter for access to multiple resources. The unified hybrid adapter 100 provides the host device 140 with transparent access to the network adapter 110 and the host adapter 120 while improving operations of the host device 140.

Once the read/write requests are directed and cached in the low-latency storage 190, requests are, for example, selectively processed by a storage device to which they are addressed. For example, consider a request from the host device 140 to write a block of information to the network storage 170. In this example, the request is directed (e.g. at 220) via the I/O interconnect 130 to the host adapter instead of being sent to the network adapter 110 for access to the network storage 170 (the actual destination). Instead at 230, the host adapter 120 initially caches the request in the low-latency storage 190.

In one embodiment, after caching the write request, the host adapter may send an acknowledgement to the host device 140 that the information has been stored as though the acknowledgement is sent from the network storage 170. In this way, the host device 140 believes the write request has been processed, which allows the host device 140 to continue and complete any remaining actions associated with the request. Since processing the write request into the cache is faster than processing the request into the network storage 170, this reduces the access latency associated with processing the write request in the network storage 170.

However, although cached, the write request has not been completed because the data has not actually been stored in the network storage 170. Instead, the request is temporarily cached in the low-latency storage 190. Thus, in one embodiment, the servicing logic 160 selects the write request from the low-latency storage 190 to fulfill the request as originally intended. The servicing logic 160 selects a read/write request to fulfill, for example, based on a priority, a quality of service, and/or an order of arrival associated with the request, or other desired selection process.

At 240, the method 200 continues by determining if a selected read/write request that was previously cached is addressed to the high latency storage device 180. If the selected request is addressed to the high-latency storage 180, then the method proceeds to 250 and the host adapter 120 services the request. In another embodiment, the host adapter 120 services a selected request if the request is addressed to any storage device that is connected to the host adapter 120.

At 240, if the request is not addressed to the high-latency storage, then the method moves to 260 where the method 200 identifies whether the selected read/write request is addressed to the network storage 170. If the selected read/write request is addressed to the network storage 170 then the method 200 proceeds to 270 and sends the selected read/write request via the I/O interconnect 130 to the network adapter 110 to be processed. The network adapter 110 communicates over a network connection with the network storage 170 and/or other network storage devices. Thus, the network adapter 110 communicates the selected read/write request to the network storage 170 to process the request.

Sending the request from the host adapter 120 to the network adapter 110 is one example of how the I/O interconnect 130 provides peer-to-peer communications within the unified hybrid adapter 100. The peer-to-peer communications are, for example, direct communications between the host adapter 120 and the network adapter 110. When communicating in this way, the host device 140 does not participate as an intermediary, which allows the host device 140 to reduces processing overhead by not performing such functions.

While elements 240-270 have been discussed in relation to method 200, in one embodiment, the servicing logic 160 controls the host adapter 120 to perform elements 240 through 270. Thus, in other embodiments, method 200 is performed by one or more logics in the unified hybrid adapter 100.

Figure 3:
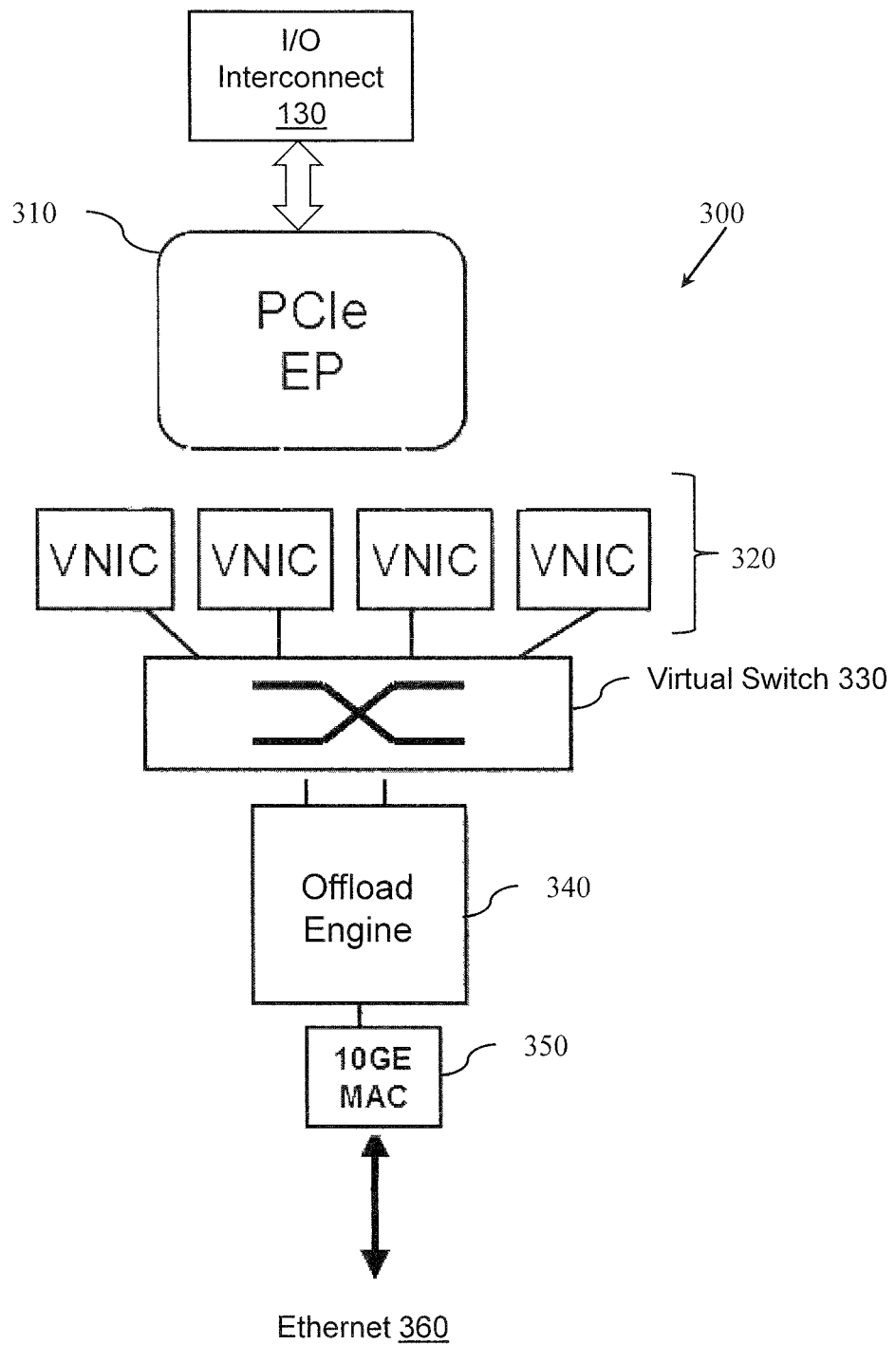
FIG. 3 illustrates one embodiment of a network adapter associated with a unified hybrid adapter.

With reference to FIG. 3, one embodiment of a network interface card (NIC) 300 is illustrated. NIC 300 is one embodiment of the network adapter 110 of FIG. 1. NIC 300 includes a PCIe endpoint (EP) interface 310 to connect with the I/O interconnect 130, as shown in FIG. 1. NIC 300 also includes one or more virtual NICs 320, a virtual switch 330, network protocol stack offload engine 340, Media Access Control (MAC) 350, and a connection to an Ethernet port 360 that provide connection to a network.

In one embodiment, NIC 300 is a converged network adapter (CNA) that operates with a multi-core processor to improve processor performance. For example, consider that a host device (e.g. host device 140 in FIG. 1) connected to the NIC 300 via I/O interconnect 130 is a server with a multi-core processor. The multi-core processor operates several instances of an operating system to improve processor performance. The instances of the operating system communicate with different virtual NICs 320 in the NIC 300 to obtain access to a network via Ethernet 360. In addition to providing virtual NICs 320 for the instances of the operating system running on the host device 140, the network protocol stack offload engine 340 performs protocol processing for communications sent from the host device. In this way, processing is offloaded from the host device to the NIC 300. The virtual switch 330 switches communications to the offload engine 340 from different virtual NICs 320 that communicate with different instances of the operating system. In one embodiment, the offload engine 340 is a TCP offload engine (TOE) that is used to offload processing of the TCP/IP stack to the NIC 300. The offload engine 340 may include an Internet Small Computer System Interface (iSCSI), and/or Fibre Channel over Ethernet (FCoE) for communicating with 10 gigabit Ethernet networks or higher speeds.

Furthermore, embodiments of the network adapter 110 including NIC 300 provide access to the network storage 170 of FIG. 1. The instances of the operating system running on the host device, for example, access the network storage 170 by sending a read/write request to the network adapter 110. The network storage 170 is, for example, a network attached storage (NAS), a storage area network (SAN), or other storage device accessible through a network connected to the network adapter 110. In other embodiments, the network adapter 110 also provides network communications to other network devices and other network storage devices.

Figure 4:
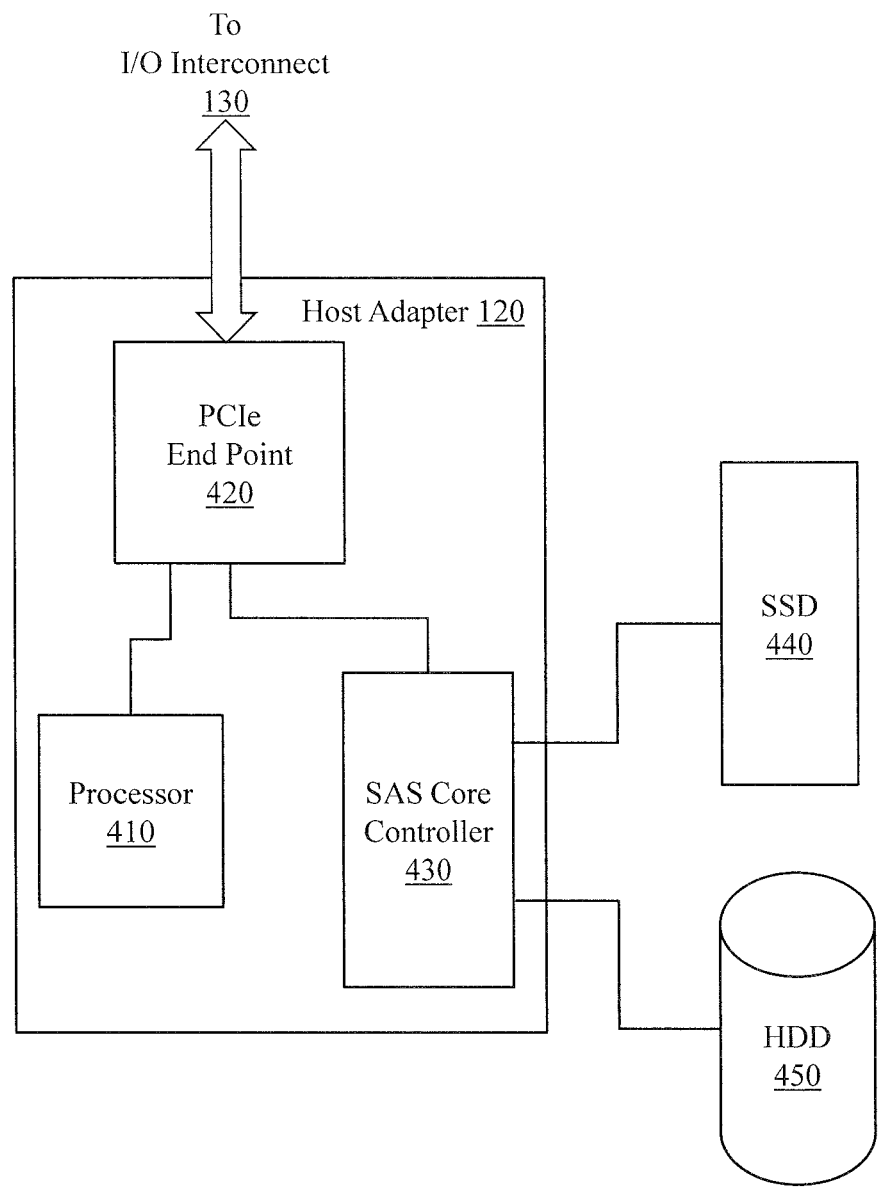
FIG. 4 illustrates one embodiment of a host adapter associated with a unified hybrid adapter.

Continuing to FIG. 4, another embodiment of the host adapter 120 of FIG. 1 is illustrated. In this embodiment, host adapter 120 includes a processor 410, a PCIe endpoint connection 420, and a serial attached SCSI (SAS) core controller 430 for providing communications with SCSI storage devices attached to the host adapter 120. The PCIe endpoint connection 420 provides a PCIe compatible connection to the I/O interconnect 130.

In one embodiment, the host adapter 120 provides connections to multiple storage devices through controller 420. As shown in FIG. 4, the SAS core controller 430 connects the host adapter 120 with two storage devices (i.e. SSD 440 and HDD 450). The solid-state device (SSD) 440 is a low-latency storage device that provides low-latency access times for caching data (e.g. read/write requests). The hard-disk drive (HDD) 450 is a high-latency storage device that is used by the host device 140 to store information. The latency is "high" relative to the access speed of the SSD 440.

While the host adapter 120 is illustrated as being connected with two storage devices it should be appreciated that the host adapter 120 may connect to a greater or lesser number of devices depending on the implementation. For example, the host adapter 120 may provide communications to high latency storage including hard-disk drives, magnetic tapes, tape libraries, and so on. The host adapter also provides communications to, for example, low-latency storage including flash memory, random-access memory, buffers, registers, SSD, and so on.

In one embodiment, the host adapter 120 provides access to storage devices through a controller (e.g. SAS controller 430). The controller is, for example, a host bus adapter (HBA) controller, a Small Computer System Interface (SCSI) controller, a fibre channel controller, an external Serial Advanced Technology Attachment (eSATA) controller, Integrated Drive Electronics (IDE) controller, Firewire controller, Universal Serial Bus (USB) controller, and so on.

Figure 5:
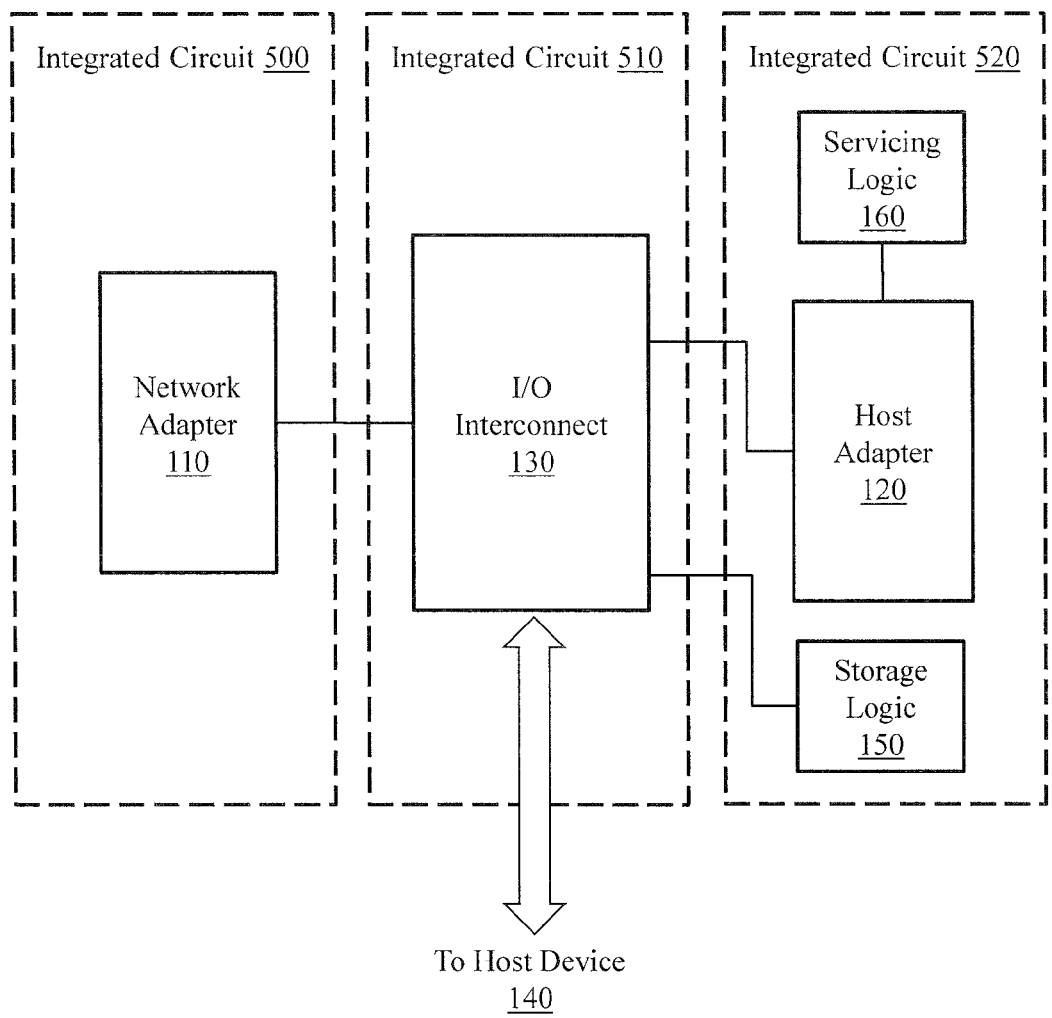
FIG. 5 illustrated one embodiment of a unified hybrid adapter embodied on multiple integrated circuits.

FIG. 5 illustrates an additional embodiment of the unified hybrid adapter 100 from FIG. 1 that is configured with separate integrated circuits and/or chips. In this embodiment, the network adapter 110 from FIG. 1 is embodied as a separate integrated circuit 500. Additionally, the I/O interconnect 130 is an individual integrated circuit 510. Furthermore, the host adapter 120, the storage logic 150 and the servicing logic 160 are also embodied on an individual integrated circuit 520. The circuits are connected via connection paths to communicate signals.

The I/O interconnect 130 embodied in integrated circuit 510 connects to the host device 140 through a system interface. The system interface is, for example, a PCIe interface, a PCI interface, an Intel QuickPath Interconnect (QPI) interface, HyperTransport (HT) interface, and so on. The switchable connection paths of the I/O interconnect 130 are, for example, embodied in an integrated circuit 510 that connects the I/O interconnect 130 with the host adapter 120 and the network adapter 120.

While integrated circuits 500, 510, and 520 are illustrated as separate integrated circuits, they may be integrated into a common circuit board. Additionally, integrated circuits 500, 510, and 520 may be combined into fewer integrated circuits or divided into more integrated circuits than illustrated. Additionally, in another embodiment, the logics 150 and 160 illustrated in integrated circuit 520 may be separate circuits or combined into a separate application specific integrated circuit. In other embodiments, the functionality associated with the logics 150 and 160 may be embodied as firmware executed by a processor (e.g. processor 410 of FIG. 4).

The following includes definitions of selected terms employed herein. The definitions include various examples and/or forms of components that fall within the scope of a term and that may be used for implementation. The examples are not intended to be limiting. Both singular and plural fauns of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Logic", as used herein, includes but is not limited to hardware, firmware, instructions stored on a non-transitory medium or in execution on a machine, and/or combinations of each to perform a function(s) or an action(s), and/or to cause a function or action from another logic, method, and/or system. Logic may include a microprocessor with programmed instructions, a discrete logic (e.g., ASIC), an analog circuit, a digital circuit, a programmed logic device, a memory device containing instructions, and so on. Logic may include one or more gates, combinations of gates, or other circuit components. Where multiple logics are described, it may be possible to incorporate the multiple logics into one physical logic. Similarly, where a single logic is described, it may be possible to distribute that single logic between multiple physical logics. One or more of the components and functions described herein may be implemented using one or more of the logic elements.

While for purposes of simplicity of explanation, illustrated methodologies are shown and described as a series of blocks. The methodologies are not limited by the order of the blocks as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional, not illustrated blocks.

To the extent that the term "includes" or "including" is employed in the detailed description or the claims, it is intended to be inclusive in a manner similar to the term "comprising" as that term is interpreted when employed as a transitional word in a claim.

While example systems, methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the systems, methods, and so on described herein. Therefore, the disclosure is not limited to the specific details, the representative apparatus, and illustrative examples shown and described. Thus, this application is intended to embrace alterations, modifications, and variations that fall within the scope of the appended claims.

What is claimed is:

1. An apparatus, comprising:
    an Input/Output (I/O) interconnect configured to connect with a host device and to provide communications with the host device;
    a network adapter connected to the I/O interconnect and configured to communicate with a network storage;
    a host adapter connected to the I/O interconnect and configured to communicate with a first storage device and a second storage device, wherein the first storage device has a higher latency than the second storage device;
    a storage logic configured to control the I/O interconnect to cause data corresponding to storage access requests from the host device to be cached in the second storage device via the host adapter and to subsequently service the storage access requests independently of the host device via the host adapter; and
    a servicing logic configured to control the host adapter to send data corresponding to a selected request from the storage access requests, wherein the data cached in the second storage device is sent to the network adapter to be processed when the selected request is addressed to the network storage, and to control the host adapter to process the selected request from the first storage device when the selected request is addressed to the first storage device, wherein the storage access requests are requests to read from or write to one of the network storage, the first storage, or the second storage.

2. The apparatus of claim 1, wherein the I/O interconnect is configured to provide communications between the host adapter, the network adapter, and the host device through switchable connection paths embodied in an integrated circuit that connects the I/O interconnect with the host adapter and the network adapter.

3. The apparatus of claim 1, wherein the host device is a multi-core processor that operates multiple instances of an operating system that communicate with the network adapter and the host adapter through the I/O interconnect, and wherein the I/O interconnect, the host adapter, and the network adapter are embodied on a chip that is configured to communicate with the host device.

4. The apparatus of claim 1, wherein the storage logic is configured to control the I/O interconnect to redirect the storage access requests from the host device when the storage access requests are addressed to the network storage or to the first storage to service the storage access requests through a cache in the second storage device.

5. The apparatus of claim 1, wherein the I/O interconnect is configured to provide the host device with access to the network adapter and the host adapter, and wherein the I/O interconnect is configured to provide peer-to-peer communications between the network adapter and the host adapter that are independent of the host device.

6. The apparatus of claim 1, wherein the I/O interconnect is a peripheral component switch that is configured to selectively switch communications between the host device and the host adapter, and between the host device and the network adapter.

7. A method, comprising:
providing an Input/Output (I/O) interconnect to switch communications between a host device and a host adapter, and between the host device and a network adapter,
wherein the host adapter communicates with a first storage device and a second storage device, wherein the first storage device has a higher latency than the second storage device, and wherein the network adapter communicates with a network storage;
caching data corresponding to a storage access request from the host adapter in the second storage device;
processing the storage access request by the host adapter when the storage access request is addressed to the first storage device; and
sending the data corresponding to the storage access request from the second storage device via the I/O interconnect to the network adapter to be processed when the storage access request is addressed to the network storage, wherein sending the data corresponding to the access request to the network adapter includes subsequently servicing the storage access requests independently of the host device after the data corresponding to the storage access request has been cached;
wherein the storage access requests are requests to read from or write to one of the network storage, the first storage, or the second storage.

8. The method of claim 7, further comprising:
providing a communication path between the host adapter and the network adapter via the I/O interconnect; and
providing a communication path between the I/O interconnect and the first storage device and the second storage device via the host adapter.

9. The method of claim 8, wherein providing a communication path between the host adapter and the network adapter via the I/O interconnect includes using switchable connection paths embodied in an integrated circuit that connect the I/O interconnect with the host adapter and the network adapter.

10. The method of claim 7, further comprising:
receiving the storage access request in the I/O interconnect through a communication path to the host device that is compatible with the peripheral component interconnect express (PCIe) standard.

11. The method of claim 7, further comprising:
receiving the read/write request from an instance of an operating system that is operating on a multi-core processor in the host device and communicates with the network adapter and the host adapter through the I/O interconnect, wherein the storage access request is a memory access request from one of the multiple instances of the operating system.

12. The method of claim 7, further comprising:
redirecting the storage access request from the host device on the I/O interconnect to the host adapter for later fulfillment, wherein sending the data corresponding to the storage access request from the second storage device via the I/O interconnect to the network adapter includes sending the data corresponding to the storage access request independent of the host device and subsequent to the data corresponding to storage access request being cached for a period of time.

13. The method of claim 12, wherein redirecting the storage access request includes redirecting the storage access request when the storage access request is directed to the network storage or the first storage device.

14. The method of claim 7, further comprising:
providing a communication path between the host adapter and the network adapter via the I/O interconnect to facilitate peer-to-peer communications between the network adapter and the host adapter.

15. An integrated circuit, comprising:
a host adapter connected to an Input/Output (I/O) interconnect and configured to communicate with a first storage device and a second storage device, wherein the first storage device has a higher latency than the second storage device;
a storage logic configured to control the I/O interconnect to cause data corresponding to the read/write requests to be cached in the low-latency storage device via the host adapter and to subsequently service the storage access requests independently of a host device via the host adapter; and
a servicing logic configured to control the host adapter to send data corresponding to a selected request from the data cached in the second storage device to a network adapter when the selected request is addressed to a network storage in communication with the network adapter, and to control the host adapter to send the data corresponding to selected request to the first storage device when the selected request is addressed to the first storage device, and wherein the network adapter is connected to the I/O interconnect, wherein the storage access requests are requests to read from or write to one of the network storage, the first storage or the second storage.

16. The integrated circuit of claim 15, wherein the I/O interconnect is configured to provide communications between the host adapter, a network adapter, and the host device through switchable connection paths embodied in an integrated circuit that connects the I/O interconnect with the host adapter and the network adapter, wherein the switchable connection paths connect the I/O interconnect to an interface that is configured to connect with the host device, and wherein the I/O interconnect is a peripheral component switch that is configured to selectively switch communications between the host device and the host adapter, and between the host device and the network adapter.

17. The integrated circuit of claim 15, wherein the host device is a multi-core processor that operates multiple instances of an operating system that communicate with a network adapter and the host adapter through the I/O interconnect, and wherein the I/O interconnect is embodied on a chip that is configured to communicate with the host device.

18. The integrated circuit of claim 15, wherein the storage logic is configured to control the I/O interconnect to redirect the read/write requests when the read/write requests are sent to a network storage or the first storage from the host device to service the read/write requests through a cache in the low-latency storage device.

19. The integrated circuit of claim 15, wherein the I/O interconnect is configured to provide the host device with access to a network adapter and the host adapter, and wherein the I/O interconnect is configured to provide peer-to-peer communications between the network adapter and the host adapter.

* * * * *